United States Patent [19]

Inoue

[11] Patent Number: 4,507,533
[45] Date of Patent: Mar. 26, 1985

[54] POWER SUPPLY CIRCUIT FOR ELECTRICAL MACHINING

[75] Inventor: Kiyoshi Inoue, Tokyo, Japan

[73] Assignee: Inoue-Japax Research Incorporated, Yokohama, Japan

[21] Appl. No.: 911,947

[22] Filed: Jun. 2, 1978

[30] Foreign Application Priority Data

| Jun. 3, 1977 | [JP] | Japan | 52-65926 |
| Jun. 8, 1977 | [JP] | Japan | 52-67610 |
| Oct. 19, 1977 | [JP] | Japan | 52-125947 |
| Oct. 26, 1977 | [JP] | Japan | 52-128492 |
| Feb. 24, 1978 | [JP] | Japan | 53-20617 |
| Mar. 10, 1978 | [JP] | Japan | 53-28751 |

[51] Int. Cl.$^3$ ............................................. B23P 1/02
[52] U.S. Cl. .................................. 219/69 P; 219/69 C
[58] Field of Search ............. 219/130.1, 130.31, 130.32, 219/130.33, 130.51, 69 P, 69 C, 69 M; 323/DIG. 1

[56] References Cited

U.S. PATENT DOCUMENTS

| 3,305,767 | 2/1967 | Beihl et al. | 323/DIG. 1 |
| 3,485,988 | 12/1969 | Sennowitz | 219/69 P |
| 3,504,152 | 3/1970 | Livshits et al. | 219/69 P |
| 3,504,154 | 3/1970 | Marcolini | 219/69 C |
| 3,728,516 | 4/1973 | Daspit | 219/130.33 |
| 3,943,321 | 3/1976 | Pfau et al. | 219/69 P |
| 4,017,705 | 4/1977 | Bazhenov et al. | 219/69 C |
| 4,048,468 | 9/1977 | Maule | 219/130.1 |

FOREIGN PATENT DOCUMENTS

2325793 12/1974 Fed. Rep. of Germany ........................ 219/130.31

Primary Examiner—Clifford C. Shaw
Attorney, Agent, or Firm—Karl F. Ross; Herbert Dubno

[57] ABSTRACT

A power-supply circuit for electrical machining of all types in which a tool is juxtaposed with a workpiece, the circuit having an alternating current input connected to the mains and receiving the alternating current at the mains' frequency, a rectifier connected to the input for converting the commercial alternating current to direct current, a solid-state switching device for converting the direct current to a high-frequency signal, a transformer whose primary winding receives the high-frequency signal and which produces a high-frequency output at a desired voltage level, a rectifier connected to this transformer at its secondary, and switch means for transforming the direct-current output of the latter device into the machining signal. The system permits the transformer to be of substantially reduced size by comparison with transformers used in earlier high-power electrical machining systems.

18 Claims, 19 Drawing Figures

POWER SUPPLY CIRCUIT FOR ELECTRICAL MACHINING

FIELD OF THE INVENTION

The present invention relates to a power supply for electrical machining and, more particularly, to improved electrical circuitry therefor.

BACKGROUND OF THE INVENTION

The term "electrical machining" is herein intended to refer to electroerosion or electrical discharge machining (EDM), electrochemical machining (ECM) and so forth and also, among others, to include electro-spark deposition (ESD) and arc welding, all of which processes are per se well known in the art.

Machines designed to perform electrical machining have hitherto commonly used a large-capacity transformer necessary to transform the magnitude of a commercial alternating-current (AC) source to an adequate level, the transformed AC being then rectified to provide a direct-current (DC) output which is in turn pulsed by switching means to produce a series of electrical pulses of a desired pulse duration, interval and frequency for application across a machining gap formed between a workpiece and a machining electrode. As is well known, the machining medium is water or oil in EDM and an electrolyte in ECM or electrodeposition processes where the pulsed application of electrical energy permits a high-current density machining or deposition. Since, however, the low-frequency commercial AC of a frequency ranging from 50 Hz to 60 Hz is utilized directly, it has been unavoidable that the transformer and the entire power supply unit is undesirably large in size and heavy in weight. Furthermore, the use of a reactor required for control purposes in this type of power supply is disadvantagous in that its response is relatively slow and most often unsatisfactory.

Apart from the above, the power supply for electrical machining requires, besides a main power supply for supplying the machining gap with machining energy in the form described, one or more auxiliary supplies which are small and hence different in capacity for operating or controlling the machine and machine components. This requirement for multiple inputs has further contributed to rendering the entire power equipment larger and heavier. Thus, power-supply units which have been proposed and in use heretofore are characterized by bulkiness and low efficiency and have left much desired.

OBJECT OF THE INVENTION

It is therefore the object of the present invention to provide an improved power supply for electrical machining which is reduced both in size and weight, high in stability and efficiency and is practically trouble-free.

In accordance with the present invention, there is provided an improved power supply for electrical machining, which includes an AC-DC-HF-DC inverter. The AC-DC-HF-DC inverter according to the invention comprises input means for receiving a commercial alternating-current (AC) power, rectifier means for converting said AC power into a direct-current (DC) output, switch means on/off controllable by an oscillator or pulser to produce from said DC output a high-frequency (HF) AC or train of pulses which is much higher in frequency than said commercial AC, transformer means for transforming the amplitude of said HF to a desired level and second rectifier means for converting the transformed HF output into a DC output of the adjusted amplitude. The latter DC output in accordance with the invention is pulsed by second switch means on/off controllable by a second oscillator to produce a train of pulses for application across a machining gap formed between a workpiece and an electrode. The said transformer means may include a primary winding in circuit with the first rectifier means and said first switch means and a plurality of secondary windings one of which is adapted to produce said second DC output through rectification by the second rectifier and others of which constitute inputs for operating or controlling operative components of the power supply or of a machine with which the power supply is installed.

BRIEF DESCRIPTION OF THE DRAWING

In the description which follows, certain embodiments of the invention will be described, reference being made to the accompanying drawing in which.

SPECIFIC DESCRIPTION

Figure 1:
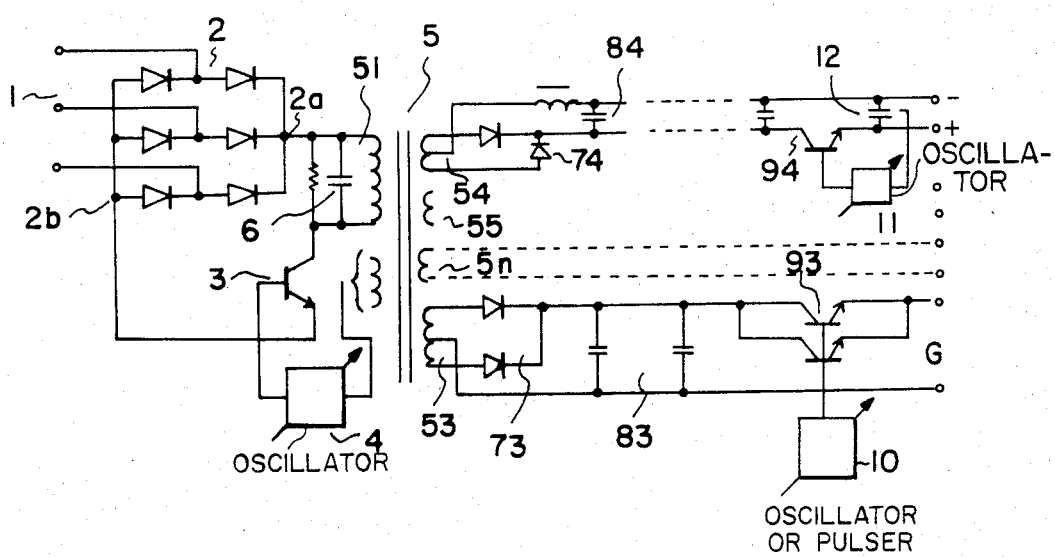
FIG. 1 is a circuit diagram illustrating a power supply embodying the invention including multiple outputs derived from a single commercial AC source.

Referring now to FIG. 1, there are shown input terminals 1 for receiving a commercial alternating-current (AC) power for rectification by a full-wave rectifier 2 which develops a direct-current (DC) output across its output terminals 2a and 2b. A switch, e.g., a bank of transistors, 3 is on/off controllable by an oscillator 4 at a frequency of at least 1 kHz, preferably from 10 to 50 kHz, to produce a high-frequency (HF) current across a network comprised of a primary winding 51 of a transfomer 5 and a capacitor 6 connected in parallel with each other. The transformer 5 is shown provided with a plurality of secondary windings 53, 54, 55 ... 5n the number of which depends on the outputs required for a particular machine and of which the winding 53 is adapted to provide machining energy. The windings 54 to 5n constitute output windings for providing control or operating signals for various power-supply and machine components. The number of turns of each winding is adjusted to provide an individually desired voltage level of a HF alternating current.

The output winding 53 constituting a part of the main or machining power supply is provided with a rectifier 73 which is in turn fed to a level-smoothing network 83 which thus provides a DC signal. The latter is pulsed by a switch 93, which may here again be a bank of transistors, on/off controllable by an oscillator or pulser 10.

In the description which follows, reference is primarily (or unless otherwise indicated) made to electroerosion or electrical-discharge machining (EDM) for the explanation of operation of the power supply circuitry according to the invention.

The oscillator 10 provides the switch 93 with a switching signal of adjustable parameters such that a series of machining pulses of a predetermined pulse duration and interval develops across the machining gap G.

The HF-AC which develops across the winding 54 is rectified by a rectifier 74 and is smoothed by a network 84 to provide a direct current. In this network as well, a switch 94 is provided operated by an oscillator or pulser 11 which is in turn operable responsive to the voltage level of a capacitor 12 connected across the load terminals $(-, +)$ to oscillate at a high frequency in the range, say, between 20 and 40 kHz to control the switch 94 so that a stabilized output $(-, +)$ is assured. The switch 93 in the main power network acts both as a pulser and an output stabilizer. In case the network is to be utilized for electrochemical machining or electrolytic deposition, the switching frequency may be increased to produce a stabilized DC voltage.

Other output windings 55 to 5n may as well be provided individually with rectifiers where DC outputs are to be obtained or with frequency converters where AC outputs are desired. Where level stabilization is not required, of course, the voltage stabilizer switch may not be provided. As a rule, this is essentially needed for transistor or the like subtle switch control and is not necessarily needed for the operation of indicator circuits for lamps, LED (light-emitting diode) LCD (liquid-crystal display) and so forth, for example.

The AC-DC-HF-DC inverter circuitry according to the invention has the advantage that any desired output voltage is obtainable ranging from zero to the rating of the transformer by adjusting the duty factor of the oscillator for providing the HF signal. In addition, since the transformer is used with signals of much higher frequency, it can be made extremely compact thereby rendering the entire power supply unit much smaller in size and lighter in weight than conventional equipments. This also permits advantageously a single transformer alone to be used for multiple outputs or both machining energy and equipment control purposes thereby further contributing to making the unit compact. It should be noted further that the output from the winding 53 for machining energy is stabilized by on/off switching control of the switch 93 so that the application of pulses across the machining gap G is effected in a predetermined mode with the result that should there even be some fluctuation in voltage occuring at the input 1, there is practically no influence thereof on the machining operation at the gap G which is in effect isolated from the source 1. Machining is thus permitted to proceed with a series of discharges stabilized and equalized in performance and hence at a high precision and efficiency. By virtue of the same stabilizing characteristics, output voltages developing at the other load terminals are likewise advantageously made substantially immune from fluctuation in voltage at the input side 1.

Figure 2:
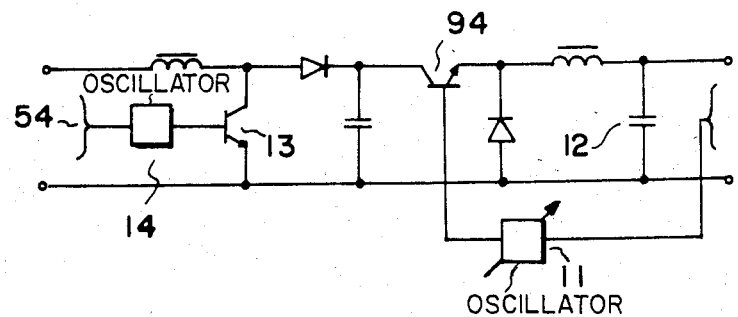
FIG. 2 is a circuit diagram illustrating a voltage stabilizer which may be employed as part of the system of FIG. 1.
Figure 3:
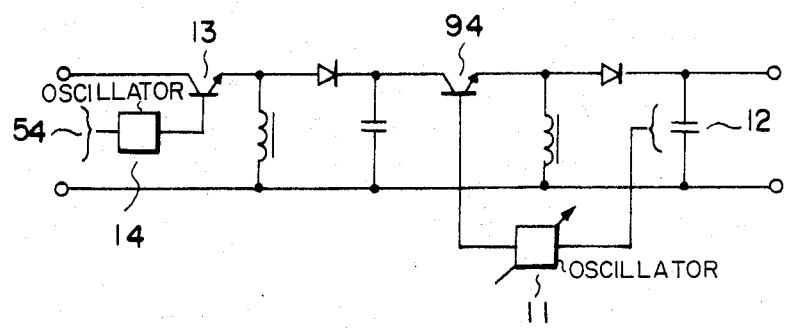
FIGS. 3 and 4 are circuit diagrams illustrating modifications of the circuit of FIG. 2.
Figure 4:
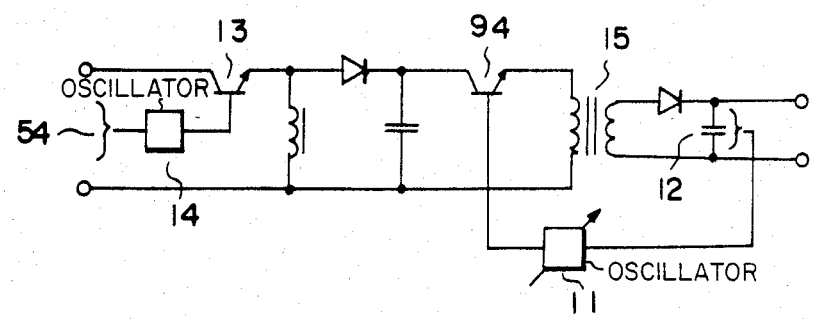

FIG. 2 shows a modified embodiment of output-voltage stabilizer in which a switch 13, e.g., a transistor, is additionally connected in parallel with the input network as controlled by an oscillator 14 which is operable in response to the input voltage. FIG. 3 shows an alternative modification in which an additional switch 13 is connected in series with the input network as operated by the oscillator 14. In still an alternative modification of FIG. 4, a further transformer 15 is provided in the output network to obtain the further transformed output. These modifications may be used essentially in the same manner as described in the foregoing.

Figure 5:
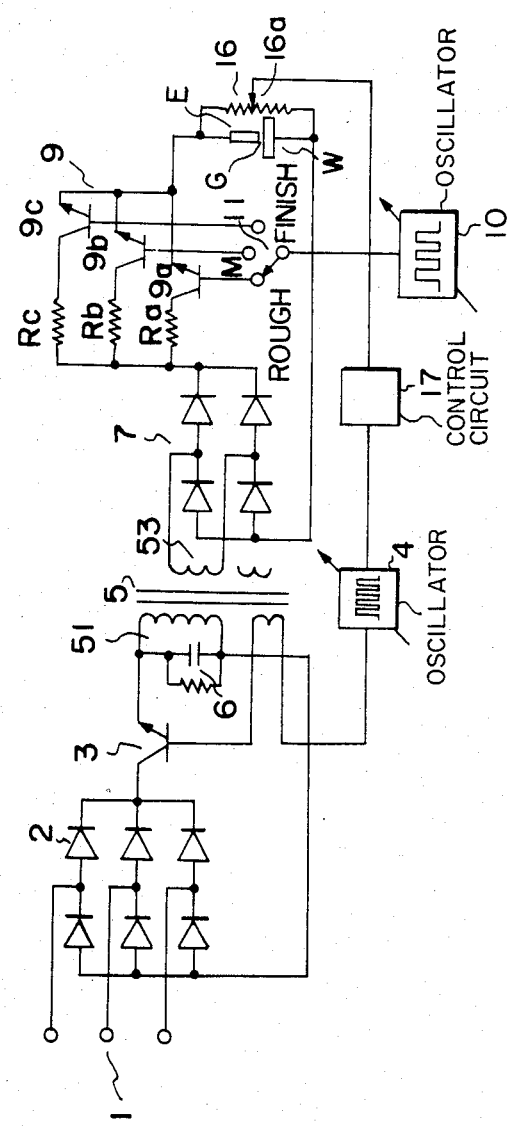
FIG. 5 is a circuit diagram illustrating an AC-DC-HF-DC converter embodying the invention adapted to be operable responsive to the gap condition of an electrical machining gap.
Figure 6:
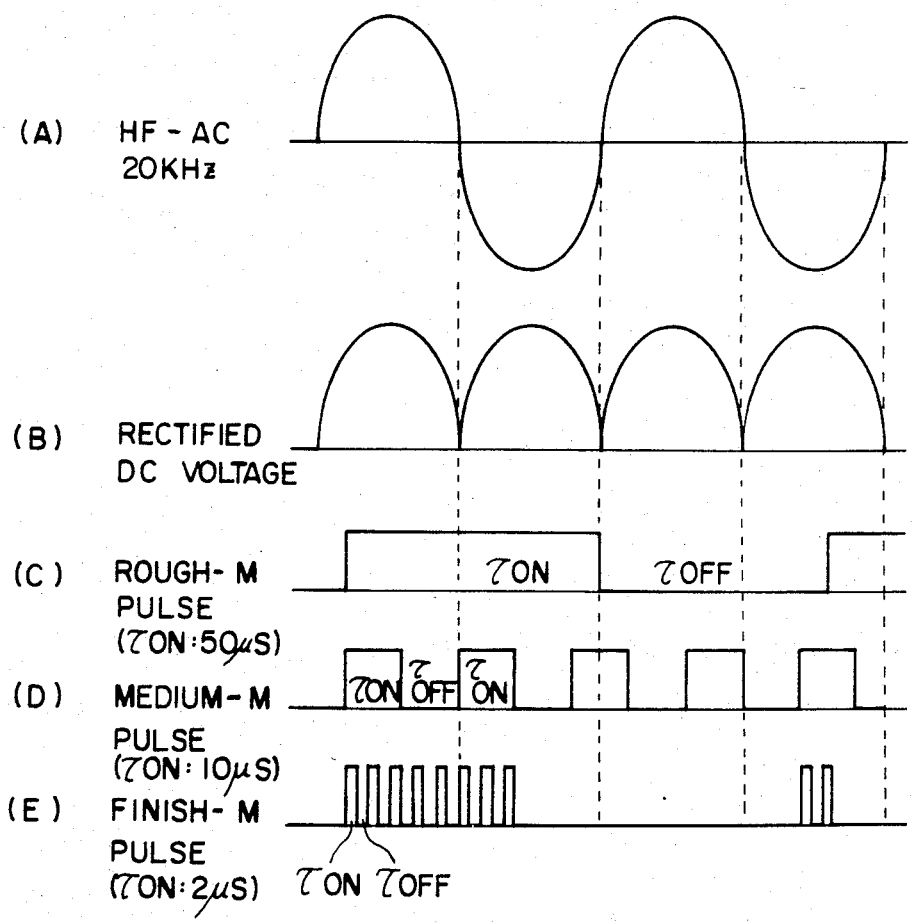
FIG. 6 illustrates waveforms appearing at various parts of an AC-DC-HF-DC converter circuitry according to the invention for different modes of EDM operation.

With reference to FIGS. 5 and 6, a description of the AC-DC-HF-DC inverter circuitry according to the invention as well as the operation thereof may be had in some more depth. In the circuitry of FIG. 5, the HF transformer 5 is shown to include the machining supply output alone, it being noted that additional outputs for control purposes may be provided as described in conjunction with FIG. 1. As already described, the HF voltage developing in the secondary winding 53 of the transformer 5 is fed to the rectifier 7 where it is converted to a DC of the same adjusted voltage amplitude. The rectified DC is pulsed by one of three switches selectively actuatable in the switching unit 9. These switches include a "rough machining" switch 9a, a "medium machining" switch 9b and "finish machining" switch 9c, each of which is operated by a pulser or oscillator 10 of variable parameters to provide across the machining gap G between an electrode E and a workpiece W a corresponding series of pulses of a predetermined pulse duration and interval or pulses of duration and interval variable within predetermined ranges. Resistors Ra, Rb, and Rc are coupled in series with transistor switches 9a, 9b and 9c, respectively for establishing the pulse peak current in the individual networks (rough-machining, medium-machining and finish-machining). Further, in this embodiment, a sensing resistor 16 is provided responsive to the gap voltage, current or impedance between the electrode E and the workpiece W with a potentiometer arm 16a coupled with the resistor 16 providing a signal proportional in magnitude to the gap voltage or impedance to a control circuit 17 for controlling the mode of operation of the oscillator 4 in accordance with the detected gap voltage, current or impedance.

As mentioned before, the pulser or oscillator 4 is operated to provide control pulses of a frequency at least 1 kHz which permits the transformer 5 to be sufficiently small in size and light in weight, the duty factor and frequency of such pulses determining the level of the HF output which is rapid in response.

The switch 9a for rough machining is operated by the pulser or oscillator 10 so as to provide a series of pulses of a pulse duration in the range between 100 microseconds and 10 milliseconds. The switch 9c for finish machining is likewise operated so as to provide a series of pulses of a pulse duration in the range between 1 and 5 microseconds with the switch 9b providing pulses of a pulse duration in the intermediary range. The pulse interval for these pulses is typically set in the range between 1 microsecond to 10 milliseconds. The resistances of resistors Ra, Rb and Rc are set such that in rough machining in which the switch 9a is operated, pulses have a peak current of several tens amperes to 1 kiloamperes and in finish machining in which the switch 9c is operated, pulses have a peak current of 1 to 10 amperes with pulses in medium machining in which the switch 9b is operated having a peak current in an intermediary range.

While the pulser 10 may be constituted by an independent oscillator, it may be designed to be responsive to the gap condition in the EDM or ECM gap G between the electrode E and the workpiece W so that the pulse repetition rate, duration and/or interval of pulses to be applied to the machining gap G may be varied to permit machining to proceed under optimum conditions.

The gap state is also shown detected by the resistor 16 which is responsive here to the gap voltage to operate the control circuit 17 which in turn operates the control of the pulser 4 such that its operating frequency and/or duty factor of switching control pulses transmitting to the switch 3 may be modified to control the level of the output AC of the transformer 5. Since the control frequency is sufficiently high in comparison with the frequency of the commercial AC input (i.e. 50 to 60 Hz), control can be accomplished at an extremely high response. Thus, upon occurrence of a short-circuiting in the machining gap G, this can be responded to instantaneously to prevent damage thereby or arcing which may result, thus rapidly causing restoration of normal gap conditions to allow machining to continue with stability and efficiency.

While it has already be mentioned that the HF-AC generated by the on/off operation of the switch 3 should have be of a frequency not lower than 1 kHz, energy efficiency is markedly enhanced when it is set to be sufficiently high in comparison with, say at least twice, the repetition rate of machining pulses, especially for rough machining.

Referring to FIG. 6, there is shown such relationship between the frequency of HF-AC and the pulse duration of machining pulses. In rough machining, machining pulses obtainable by pulsing (by the switch 9a) the DC which results from the full-wave rectification by the rectifier 7 of the HF-AC at the output winding 53 of the transformer 5 may have a pulse duration of 50 microseconds with a duty factor of 50% (or a pulse interval of 50 microseconds) as shown at waveform (c). When the HF-AC has a frequency of 20 kHz (waveform (a)), it is apparent that the alternating voltage necessarily traverses the zero level once during the machining pulse on-time $\tau$on as shown by broken lines. This means that the current limiting resistance in the DC machining pulse circuit (i.e. resistor Ra in series with the switch 9a) can be made lower than the theoretical value.

In the prior art in which DC for machining pulsing is obtained by direct rectification of a low-frequency (50 to 60 Hz) commercial AC, the pulsed machining current will have a frequency much higher than said input AC (for rectification) so that the input alternating voltage (a) does not necessarily traverse the zero level during each machining pulse on-time $\tau$on. This requires that most of current control in the machining circuit be made by a resistor (Ra) in series with the machining pulsing switch (9a). For example, in rough machining with a peak current of 200 amperes and a DC voltage of 100 volts, a circuit resistance (Ra) of 0.5 ohm is required. In comparison, only 0.1 to 0.05 ohm is sufficient for the resistor Ra in the embodiment of the invention just described.

In medium machining in which the switch 9b is operated to provide machining pulses of a pulse duration $\tau$on, say, 10 microseconds (waveform (d)), the frequency of such pulses are apparently higher than the source frequency of 20 kHz and accordingly the alternating voltage (a) does not necessarily traverse the zero level during each machining pulse on-time $\tau$on. In order for a peak machining current of 10 amperes to be attained, for example, this requires a resistance of the series resistor Rb to be 10 ohms. Further, for finish machining with $\tau$on of 2 microseconds (waveform (e)), the series resistor Rc must have a resistance of 100 ohm to obtain a pulse peak current of 1 ampere. While considerable magnitudes of resistance are thus required in medium and finish machining regions, such requirement does not pose difficulties because of low power requirement in these machining regions. Significant here is the fact that in rough-machining operations in which large-amperage peak current must be applied, considerable reduction (as much as one tenth) in circuit resistance can be accomplished, thus enhancing the power efficiency remarkably (as much as ten times).

The frequency of HF-AC may, of course, be varied as desired Thus, when wider pulse duration $\tau$on is employed, the HF frequency may be lowered and vice versa.

Figure 7:
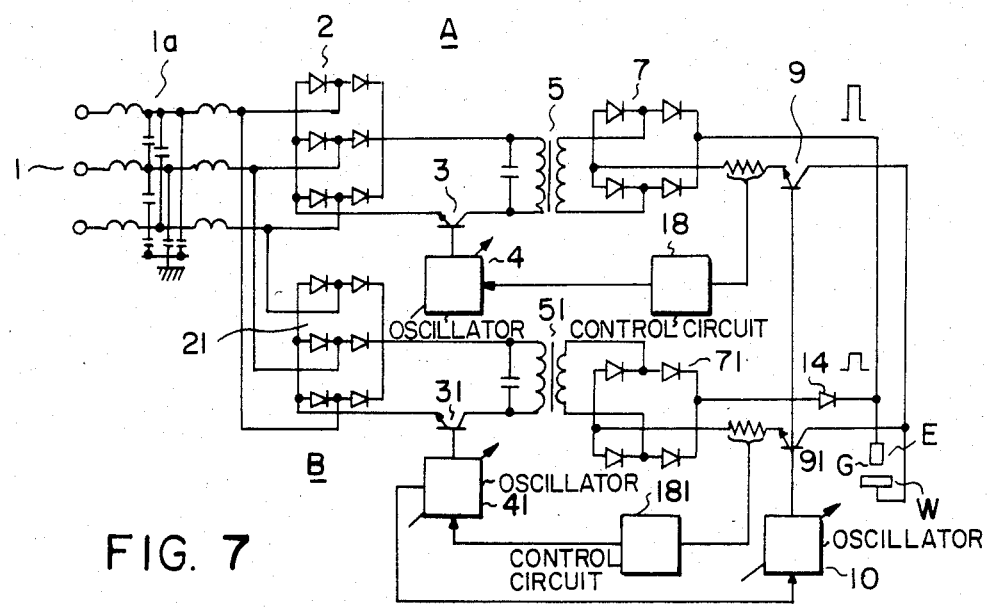
FIG. 7 is a circuit diagram illustrating further embodiment of the AC-DC-HF-DC inverter circuitry in which a high-voltage gap-breakdown pulse is superimposed upon a low-voltage machining pulse.

FIG. 7 shows a further embodiment of the invention in which the power supply comprises a high-voltage supply A and a low-voltage machining supply B, each of which is composed of basically an AC-DC-HF-DC inverter as has been described. In this FIGURE, a filter 1a omitted in other FIGURES from illustration is shown provided at the output side of the input terminals 1 for receiving a commercial AC to serve as a jamming arrester. The output windings of transformers 5 and 51 in inverters A and B are adapted to make them high-voltage and low-voltage supplies, respectively. The switch 9 in the high-voltage (HV) secondary network of the HV-inverter A and the switch 91 in the low-voltage (LV) secondary network of the LV-inverter B for pulsing the HV-DC and LV-DC, respectively, are shown operated by a common pulser or oscillator 10 concomitantly with the operation of the pulser or oscillator 41 for the switch 31 in the primary DC networks to provide a series of machining pulses of a predetermined pulse duration and interval between the electrode E and the workpiece W. It is, however, possible, of course, to provide two separate pulsers for the switches 9 and 91 individually so that upon gap breakdown or initiation of discharge, the HV-switch 9 is turned off.

Further provided in this embodiments are control units 18 and 181 which are responsive to the gap state.

In the illustrated arrangement, these units are designed to be responsive to the discharge current so as to control the pulsers 4 and 41 in such a manner that when the gap G is short-circuited, a signal responsive to the increased current magnitude interrupts the operation of the pulsers 4 and 41 and hence the operation of the inverters A and B or alternatively decreases the duty factor and/or the frequency of the pulsers 4 and 41 to facilitate restoration of the machining gap G to normal condition. The variable representative of the gap state may be replaced by the gap voltage, resistance, impedance or the magnitude of high-frequency components contained in the discharge for control of the operation of the inverters A and B.

The output parameters of the pulser 10 are adjusted in accordance with a desired mode of machining, i.e. roughing, medium or finishing, as in the previous embodiment. With the switches 9 and 91 turned on, for pulsing the HV-DC and the LV-DC, respectively, a LV machining pulse upon which is superimposed a HV gap-triggering pulse is applied across the machining gap G in each machining pulse cycle. The superimposition of a HV pulse upon a LV machining pulse facilitates the gap breakdown so as to minimize open-gap voltage pulses. The pulser 10 may be modified to operate the switch 9 at higher a frequency than the switch 91 so that several HV pulses appear superimposed upon a single LV machining pulse.

Figure 8:
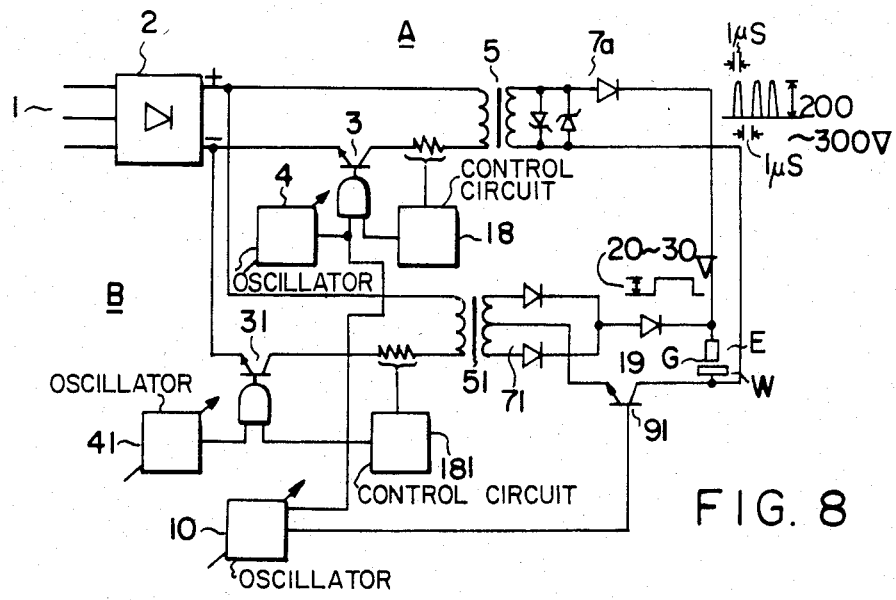
FIGS. 8 to 10 are circuit diagrams illustrating modifications of the circuitry of FIG. 7.

In a modified emodiment of FIG. 8, the secondary winding of the HV transformer 5 is simply provided with a half-wave rectifier 7a to provide a HV-HF pulsating current for superimposition upon a series of LV machining pulses from the machining power supply B. The oscillator 4 in the HV inverter A is operated at a frequency of 100 to 500 kHz while the oscillator 41 in the LV inverter B is operated at a frequency of 50 to 100 kHz. For example, with the oscillator 4 operating at a frequency of 500 kHz, HV output pulses having a pulse duration and interval both of 1 microsecond will be directly applied across the machining gap G. LV machining pulses are obtained, as in the previous embodiments, by pulsing by the switch 91 of the output DC at a a predetermined pulse duration ($\tau$on) and interval ($\tau$off), e.g., with $\tau$on of 1 to 5 microseconds in finish machining and 100 microseconds to 10 milliseconds in rough machining. In order for each LV pulse and HV pulse to be synchronized, a signal is transmitted from the oscillator 10 to the oscillator 4. HV pulses are set to have a voltage in the range between 200 to 300 volts while LV pulses are set to have a voltage in the range between 20 to 30 volts. And by superimposing HV pulses with a pulse duration of, say, 1 microsecond, repetitively upon LV machining pulses with a pulse duration in a range depending upon a mode of machining desired, discharge-triggering efficiency is enhanced and power interruption upon occurrence of gap short-circuiting is facilitated. In the embodiment of FIG. 8, control units 18 and 181 respond to direct currents in the primary networks of HV transformer 5 and LV transformer 51, respectively, and a blocking diode 19 is provided in the secondary network of the LV transformer 51.

Figure 9:
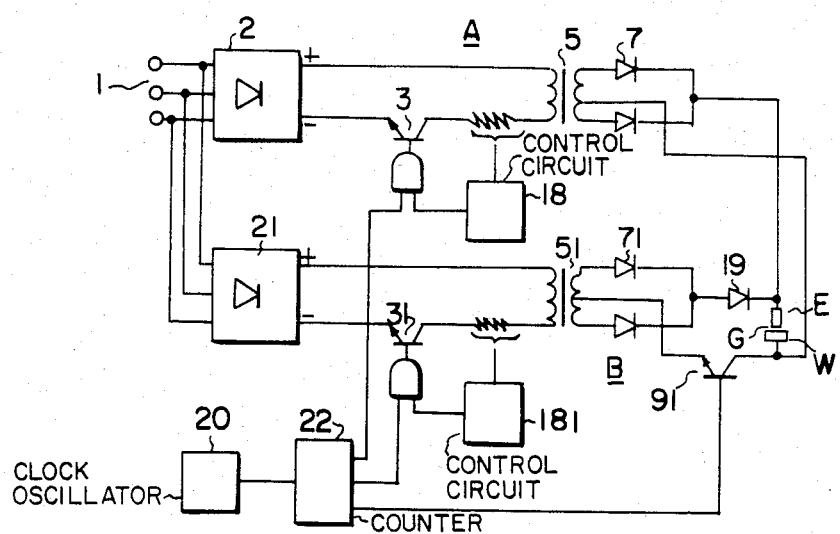

In a modified embodiment of FIG. 9, the DC output of the HV inverter A is applied without pulsing and continuously across the machining gap G while the DC output of the LV inverter B is pulsed by the switch 91 and applied across the gap G in superimposition upon the continuous HV-DC so that a machining cycle of a gap breakdown by the HV-DC followed by a LV-DC pulse is repetitively effected. In this embodiment, a clock oscillator 20 is used to provide clock pulses of a frequency, say, of 1 MHz, which are processed by a counter 22 which provides switching or control pulses of preset parameters to be applied to the switches 3 and 31 in the respective primary networks of inverters A and B as well as the switch 91 in the secondary network of the LV inverter B.

Figure 10:
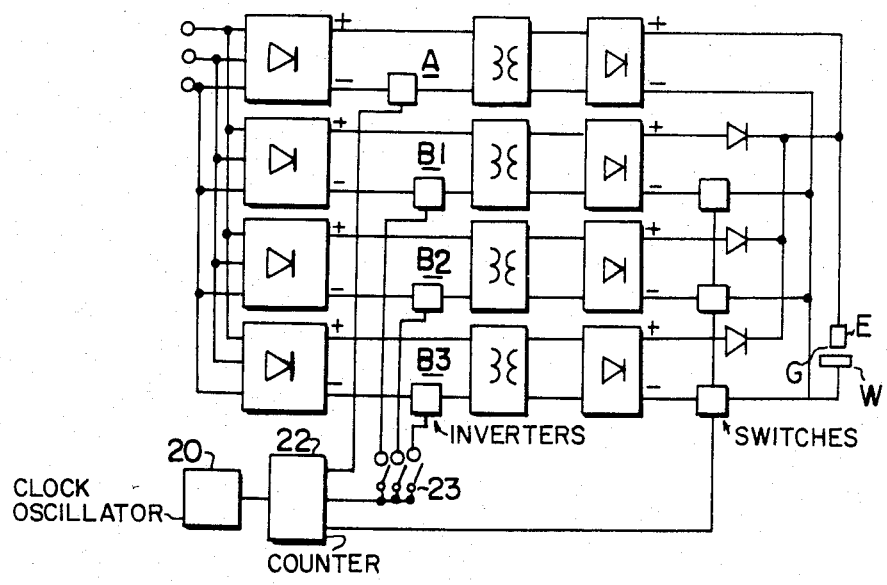

The circuit arrangement of FIG. 10 employs a plurality of LV inverters B1, B2, B3 connected in parallel with one another and selectively actuatable by a switch 23 so as to be operable in combination with a HV inverter A arranged in parallel therewith to achieve rough machining, medium machining or finish machining as desired. Thus, for rough machining, all of inverters B1, B2 and B3 may be brought into actuation to permit a maximum peak current to be delivered to the machining gap G. In medium machining two inverters B1 and B2 may be operated while in finish machining only a single inverter B1 activated.

Figure 11:
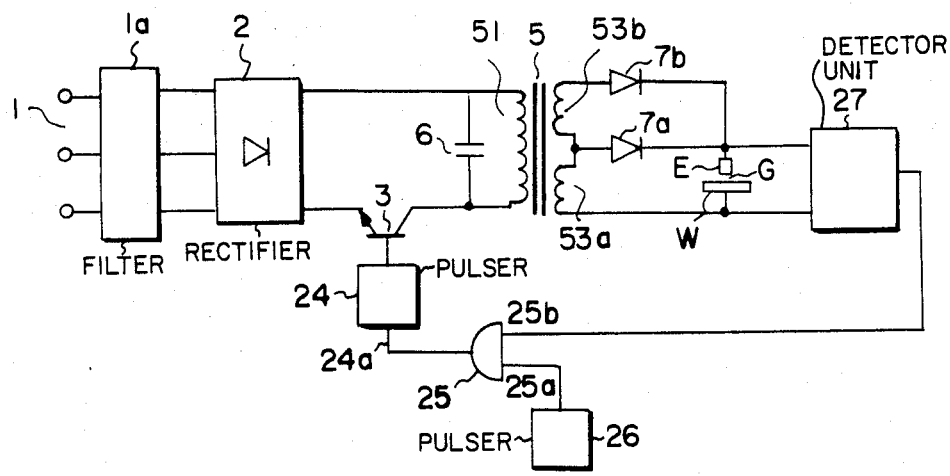
FIGS. 11 to 13 are circuit diagrams illustrating AC-DC-HF-DC inverters adapted to provide a series of pulses having intermittent pulse interruption periods or a series of group pulses constituted by unit pulses.

A modified AC-DC-HF-DC inverter circuitry shown in FIG. 11 is designed to provide trains of successive pulse groups separated by from one another by a pause time Toff, each group Ton comprising a plurality of unit pulses having a pulse duration $\tau$on of, say, 1 microsecond and a pulse interval $\tau$off of, say, 1 microsecond. The use of such trains of pulse groups comprised of unit pulses has the advantage that a better surface finish, an increased removal rate and a decreased relative electrode wear are obtainable due to an enhanced machining stability. Because of their individual size, however, an extremely high response is required to adequately control such unit pulses.

In rough machining, for example, machining energy must be delivered at a sufficiently high current density with grouped unit pulses notwithstanding the fact that individual unit pulses themselves must as well be augmented in energy. In the conventinnal system of generating group pulses, switching of DC obtained from rectification of the commercial AC has been relied upon; however, such system fails to fully satisfy the above requirements.

In the circuit arrangement of FIG. 11 embodying the principles of the invention, the switch 3, shown as a transistor, provided at the output side of the rectifier 2 for the commercial AC received at the input terminals 1 and fed through the filter 2a as in the previous embodiments is controlled by a pulser 24 which defines a duration $\tau$on and an interval $\tau$off of unit pulses. The pulser 24 has an input terminal 42a fed from an AND gate 25 having an input terminal 25a fed from a pulser 26 which defines a duration Ton and an interval Toff of pulse groups.

Figure 14:
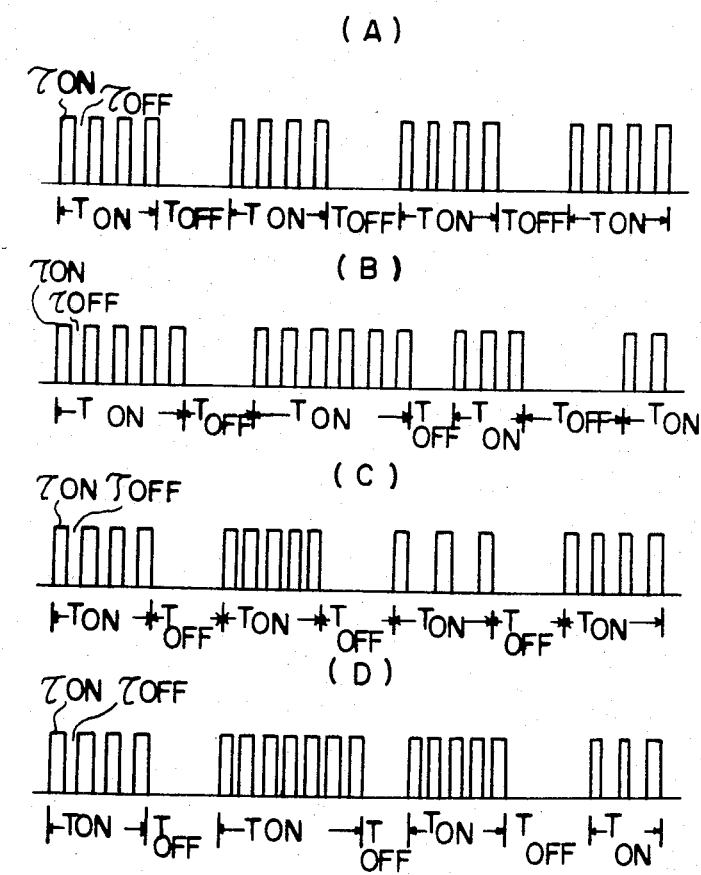
FIG. 14 is a waveform diagram illustrating various modes of group pulses applied according to the embodiments of FIGS. 11 to 13.

Thus, the switch 3 is turned on and controlled for pulsing the DC output of the rectifier 2 to provide successive groups of unit pulses with $\tau$on and $\tau$off which are typically both at minimum 1 microsecond determined by the pulser 24 during the time Ton, typically of 10 microseconds to 10 milliseconds, in which the pulser 26 provides a "1" pulse output. The switch 3 is turned and held off when and during the time in which the pulser 26 provides a "0" or no pulse output so that a pause time Toff may be interposed between successive groups of unit pulses. A typical mode of such a succession of grouped unit pulses is illustrated in FIG. 14(a). The number of unit pulses contained in each group of a succession of pulse groups is determined according to a particular mode of machining desired, i.e. rough machining, medium machining or finish machining. The duration τon and interval τoff of unit pulses are likewise determined depending upon a desired mode of machining such that τon=1 microsecond and τoff=10 to 20 microseconds in finish machining; τon=5 microseconds and τoff=15 to 20 microseconds in medium machining; and τon=50 to 100 microseconds and τoff=20 to 50 microseconds in rough machining the transformer 5 to be smaller and thus conveniently more compact. is fed from a detector circuit unit 27 which is responsive to the discharge condition in the machining gap G. This circuit unit is adapted to respond to the gap voltage so as to effect a V-F (voltage to frequency) conversion to provide signal pulses of a frequency proportional to the voltage detected at the machining gap G. The signal pulses are combined at the AND gate 25 with the output pulses from the pulser 26, the combined signal being applied to the pulser 24 to have them provide successive groups of unit pulses with modified duration τon and/or interval τoff.

The switching operation by the switch 3 with the oscillation capacitor 6 provides a high-frequency AC of pulses at a frequency in the order of 500 kHz which is converted by the transformer 5. The transformer 5 in this embodiment is shown having a first secondary winding 53a which produces a relative low voltage level, say, of 35 volts and a second secondary winding 53b which provides a relative high voltage level, say, of 200 volts. These two voltage outputs are applied, upon rectification by half-wave rectifiers 7a and 7b, respectively, across the machining gap G with the high-voltage pulse serving to trigger a gap electrical discharge and the low-voltage pulse serving to sustain the triggered machining discharge. The dual output inverter in this embodiment as well assures an operating stability and increased power efficiency. Furthermore, this enables the size of the transformer 5 to be smaller and thus conveniently more compact.

With the pulser 24 responsive both to the output of the pulser 26 and the output of the detector circuit 27, any one of various pulse control patterns as shown in FIGS. 14(b) to (d) may be obtained. FIG. 14(b) shows a trains of grouped unit pulses, both Ton and Toff are modified responsive to the gap condition such that the application of pulses proceeds with an increased number and a lengthened width Ton of a pulse group and a reduced pulse group interval Toff when the gap G is under satisfactory condition, and Ton is reduced and Toff is increased when the discharge condition tends to deteriorate. In the pulse control pattern shown in FIG. 14(c), the pulse duration and interval of unit pulses are controlled responsive to the gap discharge condition and in the pattern of FIG. 14(d) parameters of both unit pulses and pulse groups are simultaneously controlled.

Figure 12:
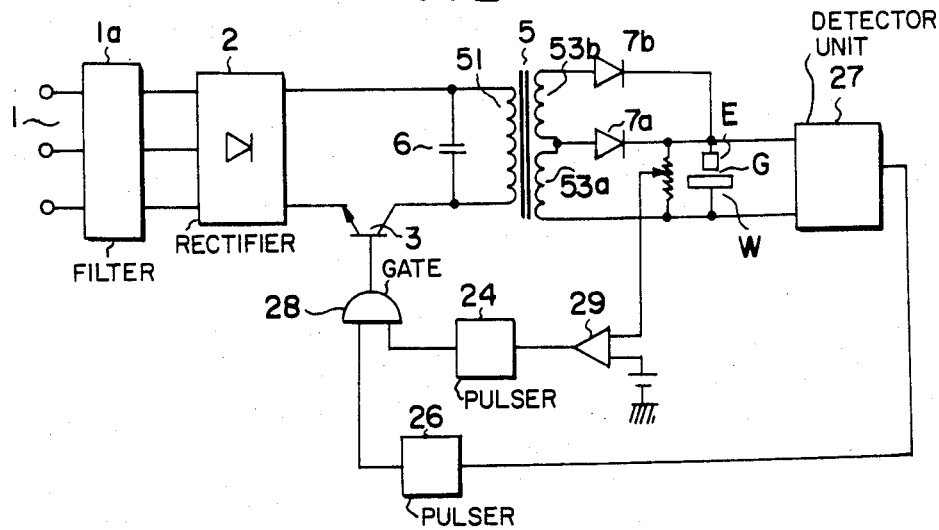

In a variation shown in FIG. 12, the pulser 24 defining the duration τon and interval τoff of unit pulses and the pulser 26 defining the duration Ton and the pause time Toff are fed to an AND gate 28 whose output is applied to the switch to produce at the machining gap G successive groups of unit pulses already described (FIG. 14a). In this variation, the pulser 24 is adapted to be responsive to a control circuit 29 which provides a comparison signal between the gap voltage and a reference voltage to modify the duration τon and the interval τoff of unit pulses. At the same time, the pulser 26, as in the preceding embodiment, is responsive to the control circuit 27 to modify the duration Ton and the pause time Toff so that the control pattern illustrated in FIG. 14(d) is obtained. With the connection between the control circuit and the pulser 26 omitted, the control mode illustrated in FIG. 14(c) is obtained.

Figure 13:
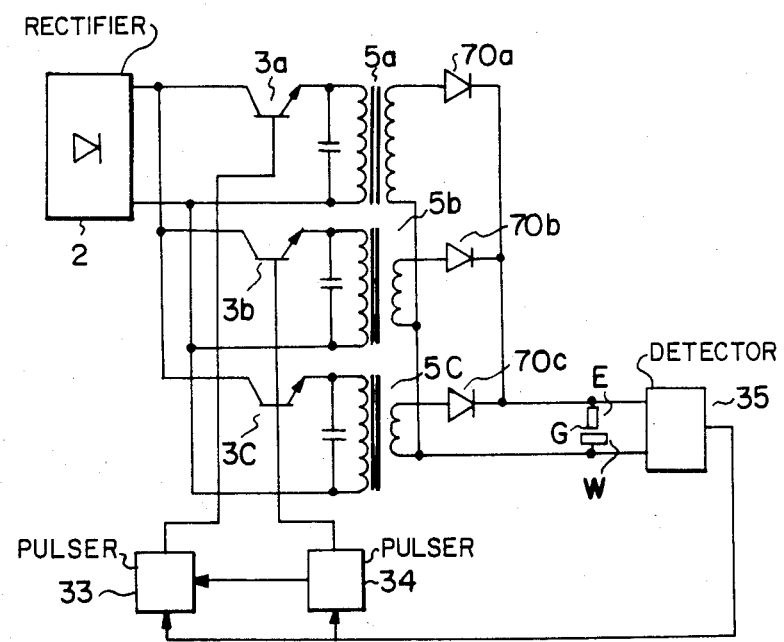

In a further variation of FIG. 13, the rectifier 2 has three DC output networks provided with switches 3a, 3b and 3c, respectively. A transformer 5a associated with the switch 3a provides at its secondary winding a high voltage of 200 to 400 volts while transformers 5b and 5c associated with switches 3b and 3c, respectively, provide a low voltage or voltages of 30 to 50 volts, each of the transformer outputs being rectified by a half-wave rectifier 70a, 70b, 70c, respectively, to provide a succession of group pulses superimposed one upon another across the machining gap G. The switch 3a is controlled by a pulser 33 which defines the duration τon and the interval τoff of unit pulses while the switches 3b and 3c are controlled by a pulser 34 which defines the duration Ton and the pause time Toff of continuous pulses. Further, the pulser 33 is controlled by the pulser 34 so that only during the time Ton, unit pulses may be permitted to issue.

Continuous pulses generated by the control of switches 3b and 3c are upon reduction in voltage by transformers 5b and 5c, delivered between the electrode E and the workpiece W. By the use of multiple outputs, an increased machining energy is thus supplied to the machining gap G with a compact, divided transformer arrangement. Of course, when a further augmented machining current is desired, the number of parallel networks is increased. High-frequency unit pulses generated by the control of the switch 3a is leveled up in voltage by the transformer 5a to the extent sufficient to trigger an electrical discharge at the machining gap G and thence upon rectification is superimposed upon the LV continuous machining pulses. Thus, during each individual continuous LV pulse Ton, there is applied a group of HV unit pulses with the duration τon and the interval τoff. Since HV unit pulses are utilized to initiate the discharge, an occasional arcing or short-circuiting is readily extinguished simply by interruption control of HV unit pulses to assure a prompt restoration of normal and stabilized machining. With either or both of pulsers 33 and 34 made responsive to a gap information network 35, the duration τon and/or the interval τoff of unit pulses and/or the duration Ton and/or the interval Toff of continuous pulses may be automatically controlled to permit stable and enhanced-efficiency machining.

Figure 15:
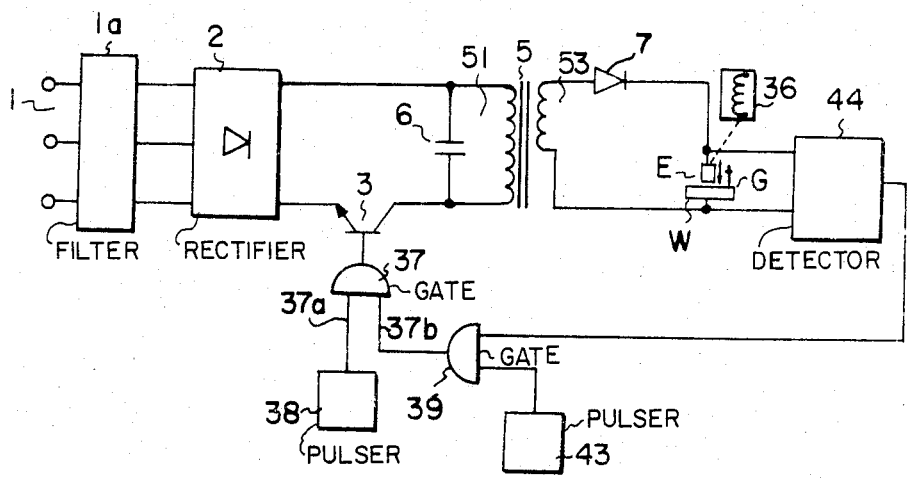
FIG. 15 is a circuit diagram illustrating an application of the embodiment of FIG. 11 to electro-spark deposition (ESD) process.

FIG. 15 illustrates an application of an AC-DC-HF-DC inverter to electrical spark deposition process according to a part of the present invention. In this system, the principles described in the preceding embodiments are basically employed with a working gap G formed by a deposition electrode E and a workpiece W juxtaposed therewith. The deposition electrode E is, in accordance with the usual practice, shown vibrated against the workpiece W by an electromechanical oscillator 36.

Heretofore, the power supply for electrical spark deposition in which material of the vibrating electrode is eroded by the energy of electrical discharge and deposited upon the surface of the workpiece makes use of charging and discharging of a capacitor connected across the electrode and the workpiece. Such systems are characterized by the limited rate of deposition and the possibility of dislodgement of the eroded layer once deposited upon the workpiece.

The AC-DC-HF-DC inverter according to the invention has now proven to overcome the above problems, especially when pulses for application across the deposition gap is controlled thereby so as to be delivered in successive groups separated from one another by a pause time adequately controlled.

As in the previous circuit arrangements, the rectifier 2 provides a DC output which is pulsed by a switch 3. The switching control signal is here fed by an AND gate 37 having a first input terminal 37a which is led from a oscillator or pulser 38 that provides control unit pulses and a second input terminal 37b which is led from a second AND gate 39. The latter gate is fed with a second oscillator or pulser 43 which provides thereto control signals for periodically or intermittently interrupting the unit pulses. The gate 39 is also fed with a gap detector 44 connected between the deposition electrode E and the workpiece W.

In electrical spark deposition process, the tip portion of the electrode E heated by an electrical discharge is transferred and deposited upon the surface of the workpiece W while the electrode E is being retracted therefrom causing the cooling of the eroded material. When the repeated heating and cooling effected by the interelectrode electrical discharge and separation, deposition is caused to proceed. The vibration of the electrode is effected usually at a frequency of the commercial AC to bring about periodic contact and separation while working pulses are here effected at a frequency at least 1 kHz so that a number of electrical discharges are produced during each vibration cycle. Consequently, an increased deposition rate is obtained in comparison with the conventional circuitry or the characitor charging and discharging system in which the electrode vibration and the pulse generation are in synchronism with each other.

Figure 16:
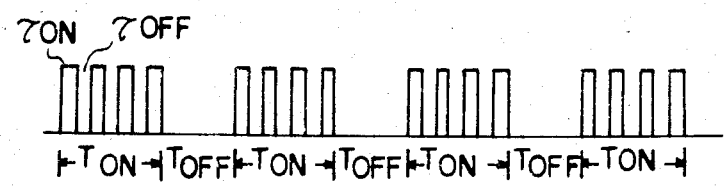
FIG. 16 illustrates waveform of pulses applied in the embodiment of FIG. 15.

The on/off operation of the switch 3 in response to control signals both from the pulser 38 and the pulser 43 provides across the deposition gap G successive groups of unit pulses with a duration Ton of each group being separated by a pause time Toff and having a preselected number of unit pulses with a duration $\tau$on and an interval $\tau$off as shown in FIG. 16. Typically, $\tau$on and $\tau$off are selected from the range of 10 and 200 microseconds and Ton and Toff from the range of 500 microseconds to 10 milliseconds.

Interposing the pause time Toff effectively cools the heated electrode E to permit to be ready for subsequent discharges in succession. A number of pause cycles are effected while the electrode E is brought into contact with the workpiece W. This has proven to increase the deposition rate markedly and at the same time to improve the surface quality of the deposited surface layer.

The gap detector 44 responsive to the electrical condition between the electrode E and the workpiece W is adapted to provide an "0" signal when the gap G is excessively expanded with the "0" signal being applied to and AND gate 39 to disable it. Control signals from the pulser 43 are thus not permitted to pass through the gate 39 to reach the gate 37 so that the switch 3 is held off and no output pulses are applied to the machining gap G. The interruption control of deposition pulses is here capable of being accomplished with a response at a high-frequency of unit pulses, thus permitting stabilized deposition process to proceed with facilitated working pulse control in synchronism with the electrode contact/separation vibration.

The AC-DC-HF-DC inverter according to the present invention is likewise applicable effectively to arc welding process.

Figure 17:
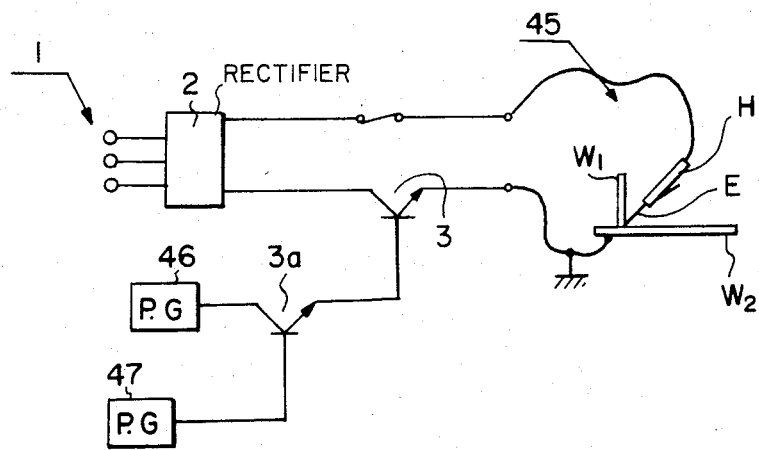
FIG. 17 is a diagrammatic illustration of an application of the AC-DC-HF-DC inverter according to the invention to arc welding process.

In FIG. 17, an arc welding system is shown comprised of a workpieces W1 and W2 to be welded together with a material fused from a welding rod electrode E supported by a holder H with a pair of output terminals 45 of a welding power supply according to the invention being shown connected across the electrode E and the workpiece W2. A power pulsing switch 3 provided, as in the embodiments described in the foregoing, at the DC side of a rectifier 2 for the commercial AC received at the input terminal 1 is controlled by the operation of a high-frequency (HF) pulser 46 and a low-frequency pulser 47 so that successive groups of unit pulses may develop at the output terminals 45 of the system. Such grouping or periodic interruption of unit pulses is here shown effected at a control switch 3a.

Figure 19:
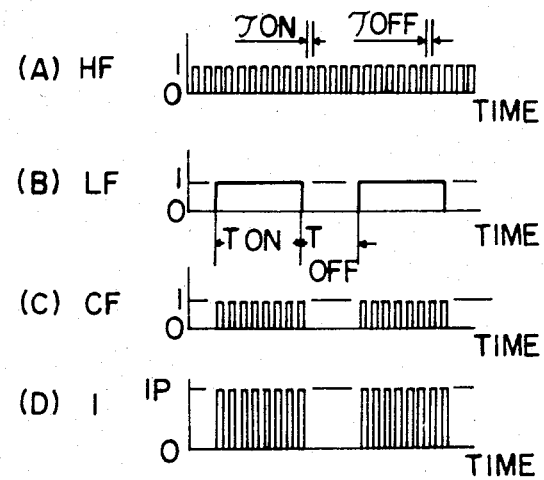
FIG. 19 illustrates waveforms of pulses appearing at different portions of the circuitry of FIG. 18.

The HF pulser 46 is adapted to provide control pulses with a duration $\tau$on and an interval $\tau$off of a frequency, say, of 10 kHz and of a waveform as shown in FIG. 19(a) while the LV pulser 47 provides control pulses with a duration Ton and a pause time Toff of a frequency, say, of 100 Hz and of a waveform as shown in FIG. 19(b). As a result, the output pulses generated and outgoing from the switch 3a assumes a waveform as shown at FIG. 19(c). Welding power pulses delivered across the welding rod E and the workpiece W1, W2 in turn assume a waveform as shown in FIG. 19(d). The output voltage V of these pulses is adjusted to be sufficiently high to trigger an arc without failure and the arc current Ip to be of a sufficient intensity to sustain a stabilized pulsed arcing.

Figure 18:
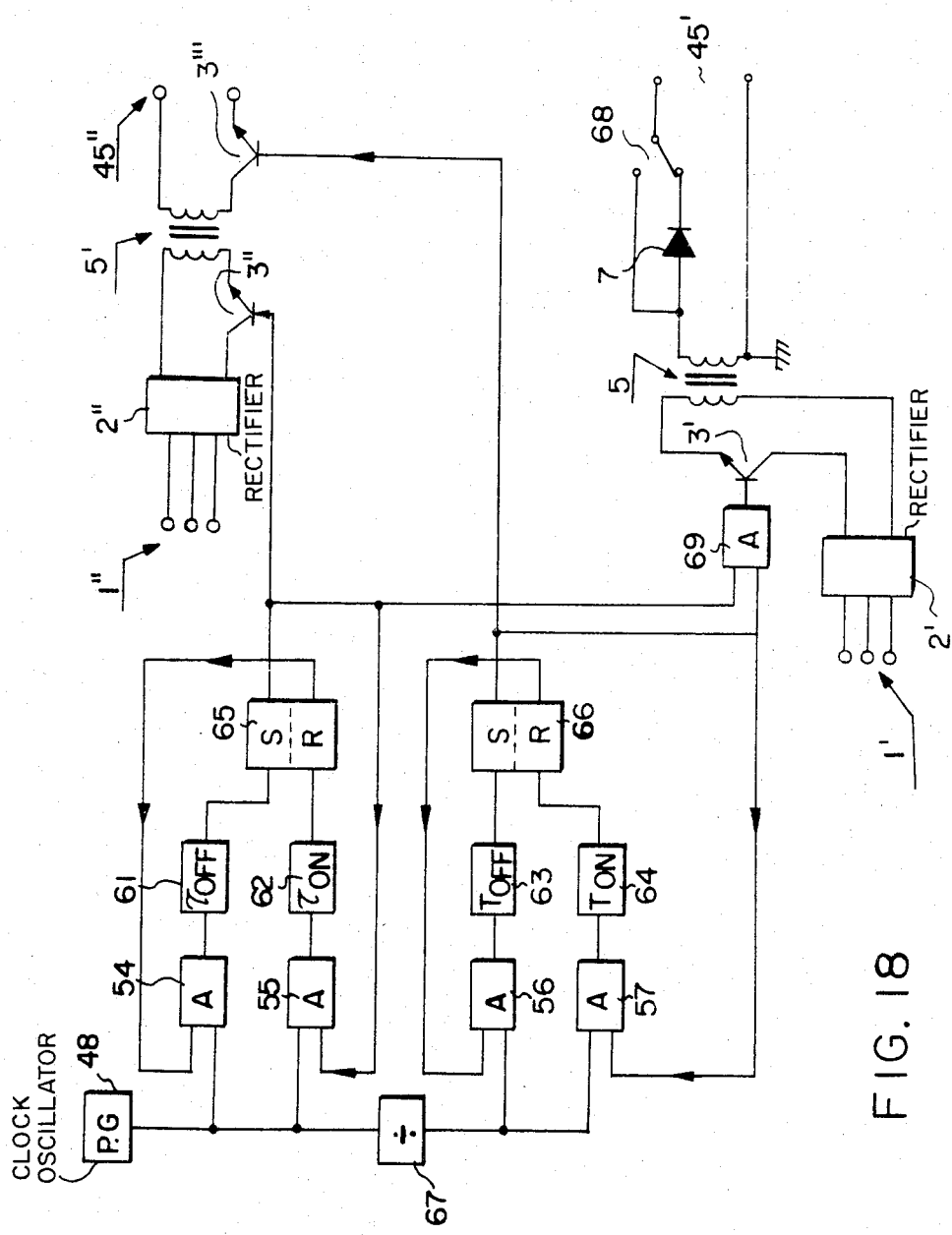
FIG. 18 is a circuit diagram illustrating the circuit portion of the embodiment of FIG. 17.

Referring to FIG. 18, there are shown two sets of input terminals 1', 1"; two rectifiers 2', 2"; switching elements 3', 3", 3'''; two sets of output terminals 45', 45" which correspond to input terminals 1; the rectifier 2; the switch 3; and output terminals 45 of FIG. 17, respectively. A clock oscillator or pulser 48 corresponds to a part of the HF pulser 46 of FIG. 17. Other circuit elements in the circuitry of FIG. 18 showing a detailed arrangement of FIG. 17 include AND gates 54, 55, 56 and 57; preset counters 61, 62, 63 and 64 defining $\tau$off, $\tau$on, Toff and Ton, respectively; RS bistable elements 65 and 66; a divider 67, high-frequency transformers 5 and 5'; a half-wave rectifier 7; and a commutator 68 in circuit connections shown.

In operation, with the bistable element 65 under set condition, HF pulses from the oscillator 48 are passed through the AND gate 55 and counted by the counter 62. Upon the count reaching a preset value, the counter 62 provides an output pulse which resets the element 65. This will cause HF-pulses from the pulser 48 to turn to enter through the gate 54 the counter 61 for counting thereby. Then, upon the count level of the counter 61 reaching a preset value, the RS bistable element 65 is returned to the set state. With the repetition of this cycle, output signal pulses as shown at FIG. 19(a) are emitted from the bistable element 65.

The bistable element 66 likewise provides output signals. Since there is, however, provided the divider 67 in its input channel, the latter signals are of a frequency much lower than the frequency of output pulses from the RS bistable element 65.

Frequencies and duty factors of output pulses of RS bistable elements 65 and 66 are preset with ease and precision by adjusting the frequency of the clock pulser 48, the frequency division of the divider 67 and the preset levels of counters 61, 62, 63 and 64.

The input of the RS bistable elements 65 and 66 are applied to an AND gate 69 whose output thus assumes the waveform illustrated in FIG. 19(c). With the commutator 68 connected to the output terminal of the rectifier 7, a pulsed welding current as shown in FIG. 19(d) develops at the terminals 54' and are applied between the electrode E and the workpiece W, W'. Otherwise or in case the commutator 68 is connected to the other output terminal, HF bipolar or alternating pulses are produced each with a duration τon and in a succession of groups at a frequency of 1 Hz. The output of the bistable element 65 is also used to control the switching element 3" in the primary side of the transformer 5' while the output of the bistable element 66 is used to control the switching element 3'" in the secondary side of the transformer 5' to supply from the terminals 45" a pulsed welding current of the waveform of FIG. 19(d) across the welding electrode E and the workpiece W, W'.

There is thus provided an improved power supply for electrical machining which is reduced to be compact and economical, yet providing trouble-free and efficiency-enhanced machining operation.

We claim:

1. A power supply circuit for electrical machining, comprising:
    transformerless input means connectable directly to a commercial alternating current at a commercial supply frequency;
    a rectifier connected to said input means directly for converting the commercial alternating current at the original voltage thereof to a direct current;
    means connected to said rectifier for pulsing said direct current to produce a high-frequency output at a frequency much higher than that of said commercial alternating current and said commercial supply frequency, said high-frequency output being at least 1 kHz;
    a high-frequency transformer connected to said pulsing means for transforming the voltage magnitude of said high-frequency output to a high frequency signal at said high frequency of at least 1 kHz to a desired voltage level of said high-frequency output; and
    means connected to said transformer for producing from said high-frequency signal a series of unidirectional electrical machining pulses of predetermined pulse parameters and applying same across a machining gap formed between an electrical machining electrode and a workpiece juxtaposed therewith, said pulsing means including a switching element connected in series with said rectifier and a primary winding of said transformer, and an oscillator connected to said switching element and having the frequency of said high-frequency output for triggering said switching element at the frequency of the high-frequency output, a capacitor being coupled across said primary winding in series with said switching element and said rectifier, the means for producing the unidirectional electrical machining pulses including a second rectifier connected in series with a secondary winding of said high-frequency transformer for converting the transformer high-frequency output of said high-frequency transformer into a second direct current, a second switching element connected in series with said second rectifier for pulsing said second direct current, and a second oscillator having preset pulse parameters of the unidirectional electrical machining pulses connected to said second switching element for triggering same.

2. A power supply circuit for electrical machining, comprising:
    transformerless input means connectable directly to a commercial alternating current at a commercial supply frequency;
    a rectifier connected to said input means directly for converting the commercial alternating current at the original voltage thereof to a direct current;
    means connected to said rectifier for pulsing said direct current to produce a high-frequency output at a frequency much higher than that of said commercial alternating current and said commercial supply frequency, said high-frequency output being at least 1 kHz;
    a high-frequency transformer connected to said pulsing means for transforming the voltage magnitude of said high-frequency output to a high frequency signal at said high frequency of at least 1 kHz to a desired voltage level of said high-frequency output; and
    means connected to said transformer for producing from said high-frequency signal a series of unidirectional electrical machining pulses of predetermined pulse parameters and applying same across a machining gap formed between an electrical machining electrode and a workpiece juxtaposed therewith, the high frequency of the high-frequency output being at least twice the repetition rate of said unidirectional electrical machining pulses, the means for producing the unidirectional electrical machining pulses including a second rectifier connected in series with a secondary winding of said high-frequency transformer for converting the transformed high-frequency output of said high-frequency transformer into a second direct current, a second switching element connected in series with said second rectifier for pulsing said second direct current, and a second oscillator having preset pulse parameters of the unidirectional electrical machining pulses connected to said second switching element for triggering same.

3. The power supply circuit defined in claim 2 wherein the high frequency of said high-frequency output is between 10 and 50 kHz.

4. The power supply circuit defined in claim 1, claim 2 or claim 3 wherein said high-frequency transformer has at least one additional secondary winding, said circuit further comprising a third rectifier connected to said additional secondary winding, and a voltage stabilizer connected to said third rectifier for energizing a load independent of said machining gap.

5. The power supply circuit defined in claim 4 wherein said voltage stabilizer has a capacitor connected across said load, an electronic switch connected in series with said third rectifier and said capacitor, and a third oscillator operational at a frequency which is a function of the voltage level of said capacitor for triggering the last mentioned electronic switch and thereby stabilizing the direct current applied across said load.

6. The power supply circuit defined in claim 5, further comprising a second electronic switch connected with said additional secondary winding at the input side of said third rectifier, and a fourth oscillator connected to said second electronic switch for triggering same in response to the input voltage at said additional secondary winding.

7. The power supply circuit defined in claim 4 wherein said voltage stabilizer comprises an electronic switch connected at the output side of said third rectifier and a further transformer having a primary winding in series with said third rectifier, said further transformer having a secondary winding connected via a fourth rectifier with said load, a further capacitor connected across the secondary winding of said further transformer, a further oscillator connected to said further electronic switch and operational in response to a voltage level developed across said further capacitor.

8. The power supply circuit defined in claim 1, claim 2 or claim 3, further comprising gap detector means responsive to at least one electronic variable in said machining gap for controlling the operation of said pulsing means to modify said unidirectional machining pulses in accordance with the machining state in said machining gap.

9. The power supply circuit defined in claim 1, claim 2 or claim 3, further comprising a jamming arrestor connected between said input means and said rectifier.

10. The power supply circuit defined in claim 1, 2 or 3 wherein a second rectifier is connected to said input means directly for converting the commercial alternating current at the original voltage thereof to a second direct current, second pulsing means is connected to said second rectifier for pulsing said second direct current to produce a second high-frequency output, a second high-frequency transformer is connected to said second pulsing means, and second means is connected to said second transformer for producing from a second high-frequency signal thereof a series of machining pulses which are applied across the same gap.

11. The power supply circuit defined in claim 1, 2 or 3 further comprising second pulsing means connected to said rectifier to produce a second high-frequency output from the direct current thereof, a seond high-frequency transformer connected to said second pulsing means, and second means connected to said second transformer for producing from the high-frequency signal thereof a series of electrical machining pulses which are applied to the same gap.

12. The power supply circuit defined in claim 1, 2 or 3 further comprising a second high-frequency transformer connected to said input means by a rectifier and second pulsing means at the input to said second transformer, said second transformer having an output which is applied through a half-way rectifier to said gap.

13. A power-supply circuit connectable between a tool electrode and a conductive workpiece, said circuit comprising:
input means directly connectable to a source of commercial alternating current at a commercial supply frequency;
a rectifier connected to said input means and directly converting the commercial alternating current to a direct current;
solid-state switch means connected to said rectifier for pulsing said direct current to produce a high-frequency output of a frequency much higher than that of the commercial alternating current, said high frequency being at least 1 kHz;
a high-frequency transformer having at least one primary winding connected to said switch means for transforming the voltage magnitude of said high-frequency output to a high-frequency signal of said high-frequency at a desired level;
a further rectifier for transforming said high-frequency signal into a direct-current signal; and
a further solid-state switch connected between said further rectifier and said electrode and said workpiece for applying between said electrode and said workpiece a series of unidirectional machining pulses of predetermined pulse parameters, said unidirectional machining pulses having a repetition rate not greater than one half of said frequency of the high-frequency output, said transformer has a first secondary winding connected to said further rectifier and at least one additional secondary winding, each of said solid-state switches being provided with respective pulsing means for determining the frequencies of said high-frequency signal and of said unidirectional machining pulses, said additional secondary winding being provided with a capacitor connected across a load and pulsed switching means responsive to the voltage level of said capacitor for stabilizing the voltage applied to the load.

14. The circuit defined in claim 13, further comprising feedback means electrically connected with said electrode and said workpiece and connected to one of said pulsing means for controlling at least one of the frequencies determined thereby in response to a condition detected across the electrode and the workpiece.

15. The circuit defined in claim 13 wherein a voltage signal derived from the secondary windings of said transformer is applied across the electrode and the workpiece.

16. The circuit defined in claim 13 wherein said electrode and said workpiece together form an electrical machining network having a gap between the electrode and the workpiece receiving a machining liquid.

17. The circuit defined in claim 13 wherein said primary winding of the transformer has a capacitor coupled thereacross in series with said rectifier and first solid-state switch means.

18. The circuit defined in claim 13, further comprising means for intermittently interrupting said unidirectional pulses so as to provide successive groups of machining pulses separated from one another by a pause time.

* * * * *